US008233271B2

(12) United States Patent
Kusaka (10) Patent No.: US 8,233,271 B2
(45) Date of Patent: Jul. 31, 2012

(54) ELECTRONIC APPARATUS (75) Inventor: Hiroyuki Kusaka, Mitaka (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 141 days.

(21) Appl. No.: 12/885,344

(22) Filed: Sep. 17, 2010

(65) Prior Publication Data

US 2011/0149489 A1    Jun. 23, 2011

(30) Foreign Application Priority Data

Dec. 18, 2009   (JP) .................................. 2009-288049

(51) Int. Cl.
*H05K 5/00* (2006.01)
*H05K 7/00* (2006.01)

(52) U.S. Cl. ......... 361/679.02; 361/679.01; 361/679.26; 361/679.27

(58) Field of Classification Search ............. 361/679.01, 361/679.02, 679.26, 679.27
See application file for complete search history.

(56) References Cited

U.S. PATENT DOCUMENTS

| 5,847,630 | A  | * | 12/1998 | Arnold et al. ................... 335/35 |
| 6,211,648 | B1 | * | 4/2001  | Chew .............................. 320/112 |
| 6,302,454 | B1 | * | 10/2001 | Tsurumaru et al. ............ 292/175 |
| 6,617,063 | B1 | * | 9/2003  | Ohnishi .............................. 429/7 |
| 7,322,835 | B2 | * | 1/2008  | Lin et al. ........................ 439/96 |
| 7,914,919 | B2 | * | 3/2011  | Wang ............................ 429/100 |
| 7,961,464 | B2 |   | 6/2011  | Ijima |
| 2006/0210869 | A1 | | 9/2006 | Takeguchi et al. |
| 2009/0053590 | A1 | | 2/2009 | Yamaguchi |
| 2009/0233161 | A1 | | 9/2009 | Miyamae et al. |
| 2009/0244839 | A1 | | 10/2009 | Iijima |
| 2011/0205699 | A1 | | 8/2011 | Iijima |

FOREIGN PATENT DOCUMENTS

| JP | 08-083135 A | 3/1996 |
| JP | 11-120972 A | 4/1999 |
| JP | H11-134065 | 5/1999 |
| JP | 11-195407 A | 7/1999 |
| JP | 2006-260973 A | 9/2006 |
| JP | 2008-287977 | 11/2008 |
| JP | 2009-224072 | 10/2009 |
| JP | 2009-237955 | 10/2009 |

OTHER PUBLICATIONS

Notification of Reasons for Rejection mailed by the Japan Patent Office on Feb. 15, 2011 in the corresponding Japanese patent app. No. 2009-288049 in 9 pages.
Notification of Reasons for Rejection mailed by the Japan Patent Office on Jul. 12, 2011 in the corresponding Japanese patent app. No. 2009-288049 in 5 pages.

* cited by examiner

*Primary Examiner* — Anthony Haughton
(74) *Attorney, Agent, or Firm* — Knobbe Martens Olson & Bear LLP (57) ABSTRACT

An electronic apparatus includes a body housing having a battery housing portion configured to accommodate a battery therein, a display housing in which a display device is accommodated, and a hinge portion connected to an end portion of the display housing. The hinge portion connects the display housing and the body housing such that the display housing and the body housing are relatively rotatable between a first position in which a display screen of the display device is covered with the body housing and a second position in which the display screen is uncovered. The battery housing portion has a bulged portion which is bulged outward from a portion of the body housing that faces the end portion of the display housing in the first position, and the bulged portion has a flat wall portion which extends toward the display housing.

8 Claims, 6 Drawing Sheets

ELECTRONIC APPARATUS

CROSS-REFERENCE TO RELATED APPLICATION(S)

This application is based upon and claims the benefit of priority from Japanese Patent Application No. 2009-288049 filed on Dec. 18, 2009, the entire contents of which is incorporated herein by reference.

FIELD

Embodiments described herein relate generally to an electronic apparatus.

BACKGROUND

To improve portability of an electronic apparatus, such as a portable computer, a housing defining an outer contour of the electronic apparatus may be formed thinly and compactly.

However, making the housing thin and compact may result in a reduction of a capacity of a battery unit of the electronic apparatus. On the other hand, ensuring a sufficient capacity of the battery unit of the electronic apparatus by arranging the battery unit to protrude form the electronic apparatus may hamper a reduction in apparent size.

BRIEF DESCRIPTION OF THE DRAWINGS

A general architecture that implements the various features of the invention will now be described with reference to the drawings. The drawings and the associated descriptions are provided to illustrate embodiments of the invention and not to limit the scope of the invention.

DETAILED DESCRIPTION

Various embodiments according to the invention will be described hereinafter with reference to the accompanying drawings.

In general, according to one embodiment of the invention, an electronic apparatus includes a body housing having a battery housing portion configured to accommodate a battery therein, a display housing in which a display device is accommodated, and a hinge portion connected to an end portion of the display housing. The hinge portion connects the display housing and the body housing such that the display housing and the body housing are relatively rotatable between a first position in which a display screen of the display device is covered with the body housing and a second position in which the display screen is uncovered. The battery housing portion has a bulged portion which is bulged outward from a portion of the body housing that faces the end portion of the display housing in the first position, and the bulged portion has a flat wall portion which extends toward the display housing.

An electronic apparatus according to an exemplary embodiment of the invention is a portable computer 1 which is illustrated in FIGS. 1 to 4. The portable computer 1 has a body unit 2 and a display unit 3.

Figure 1:
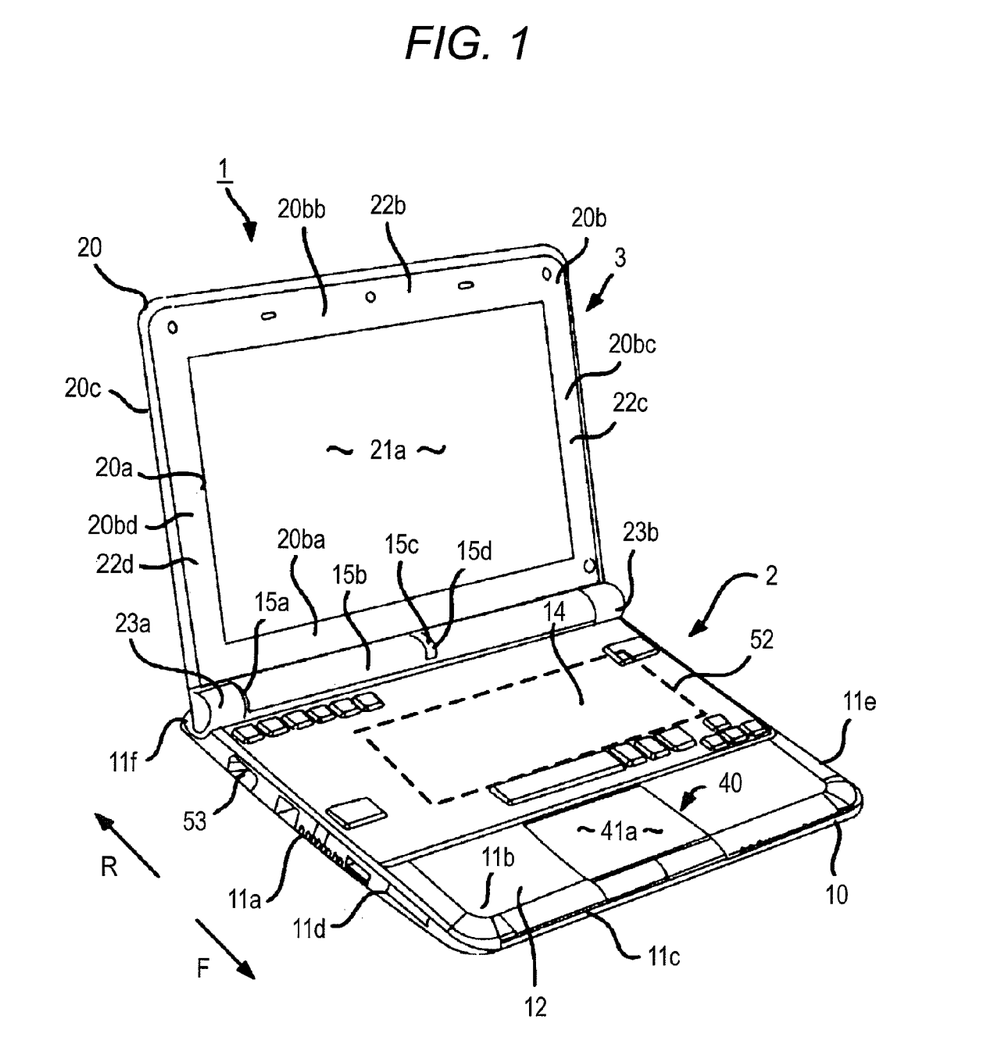
FIG. 1 is an exemplary top perspective view of a portable computer as an electronic apparatus according to an embodiment of the invention.
Figure 2:
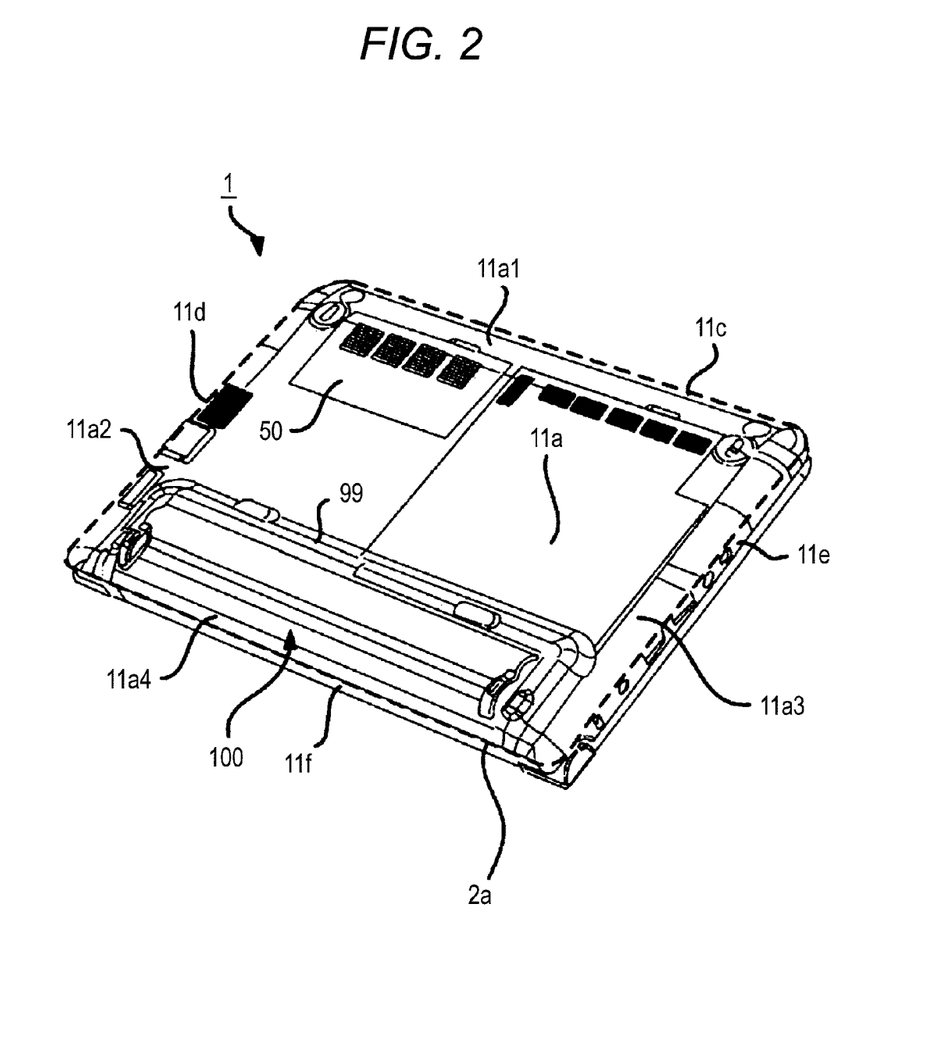
FIG. 2 is an exemplary bottom perspective view of the portable computer according to the embodiment.
Figure 3:
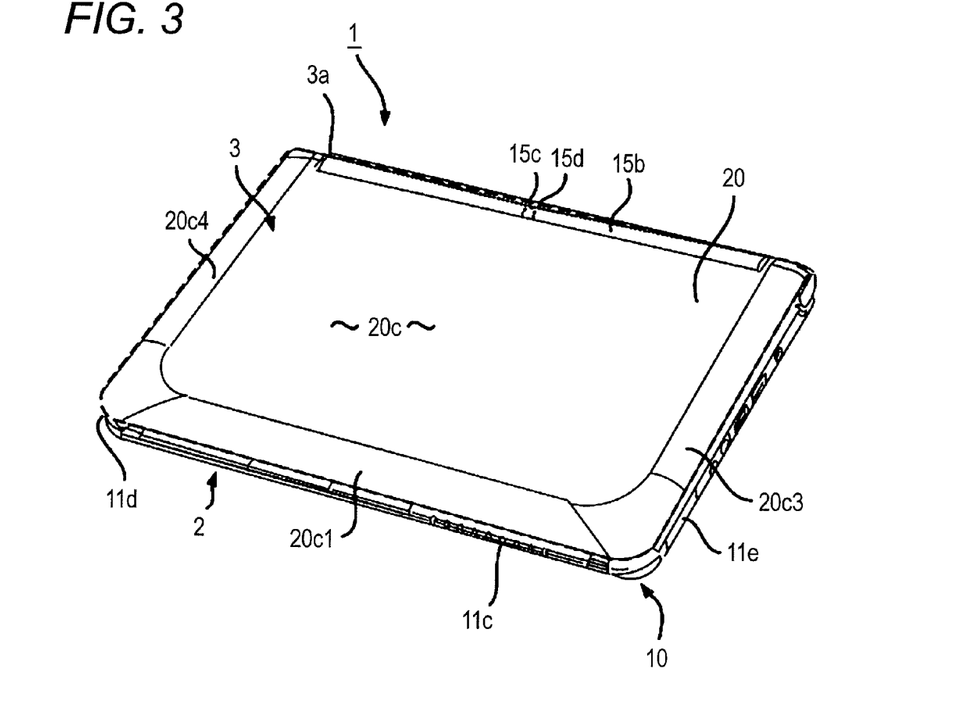
FIG. 3 is another exemplary top perspective view of the portable computer according to the embodiment.
Figure 4:
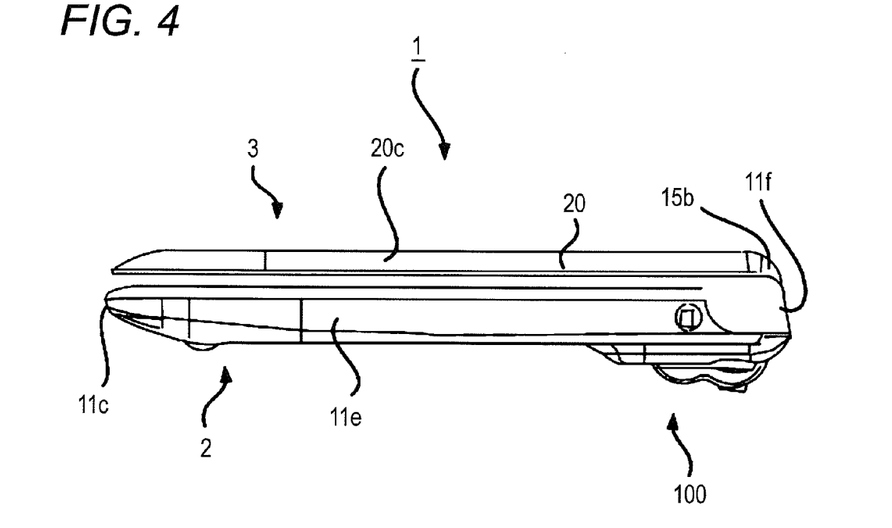
FIG. 4 is an exemplary side view of the portable computer according to the embodiment.

FIG. 1 is an exemplary top perspective view of the portable computer 1. FIG. 2 is an exemplary bottom perspective view of the portable computer 1. FIG. 3 is another exemplary top perspective view of the portable computer 1. FIG. 4 is a side view of the portable computer depicted in FIG. 1.

As shown in FIG. 1, the body unit 2 has a first housing 10 shaped like a flat box. The first housing 10 has a bottom wall portion 11a, a top wall portion 11b, a front wall portion 11c, left and right side wall portions 11d, 11e, and a rear wall portion 11f. An outer surface of the top wall portion 11b has a palm rest 12 on the user's side (i.e., on the front side).

The top wall portion 11b has a keyboard attachment portion in the rear of the palm rest 12. A keyboard 14 is attached to the keyboard attachment portion for inputting numerals, characters, etc. In FIG. 1, an arrow F indicates the front of the portable computer 1, and an arrow R indicates the rear of the portable computer 1.

The bottom wall portion 11a includes a front oblique surface portion 11a1, left and right side oblique surface portions 11a2 and 11a3 and a rear oblique surface portion 11a4 which extend to the front wall portion 11c, the left and right side wall portions 11d and 11e and the rear wall portion 11f respectively. The oblique surface portions 11a1 to 11a4 extending along the front wall portion 11c, the left and right side wall portions 11d, 11e and the rear wall portion 11f, which are substantially perpendicular to the bottom wall portion 11a respectively, makes the external appearance of the portable computer 1 look small. In particular, as shown in FIG. 4, the external appearance of the portable computer 1 can be made to look more compact when viewed from a side.

The portable computer 1 has a circuit board 52 housed therein. Electronic components such as a connector 53, etc. are provided on an outer edge portion of the circuit board 52. The portable computer 1 may be designed so that the electronic components such as a connector 53, etc. provided on the outer edge of the circuit board 52 are mounted in the rear section of the first housing 10. According to this configuration, the front section of the first housing 10 of the portable computer 1 can be formed thinly as shown in FIG. 4. As a result, the apparent thickness of the portable computer 1 in a front view can be reduced without reducing the number of connectors or lowering the functions.

A rear end portion of the first housing 10 has a connecting recess 15a and a connecting protrusion 15b which is fitted into the connecting recess 15a. The connecting recess 15a is a recess that is opened frontward, downward and rearward of the first housing 10. The connecting recess 15a and the connecting protrusion 15b are provided to extend in a width direction (a lateral direction) of the body unit 2.

A power switch 15c is provided in the connecting protrusion 15b. The power switch 15c has a circular cylindrical shape, and is provided in an opening portion 15d of the connecting protrusion 15b. The power switch 15c has substantially the same diameter as that of the connecting protrusion 15b so that it looks as if the power switch 15c and the connecting protrusion 15b are formed as a one body.

As shown in FIG. 3, the connecting protrusion 15b in the embodiment has flexibility. When the connecting protrusion 15b is pressed from the outside, a portion of the connecting protrusion 15b around the opening portion 15d can sink toward the inside of the first housing 10. With this configuration, the user can push down the power switch 15c although the power switch 15c has substantially the same diameter as that of the connecting protrusion 15b, and a clicking feeling can be given to the user. That is, the user does not feel that it is difficult to press the power switch 15c though the power switch 15c does not protrude out from the first housing 10. This configuration contributes to reduction in size and thickness of the first housing 10.

The display unit 3 has a second housing 20, and a liquid crystal display panel 21 as a display device. The liquid crystal display panel 21 is accommodated inside the second housing 20. The liquid crystal display panel 21 has a screen 21a on which an image is displayed. An opening portion 20a from which the screen 21a is exposed is provided in the second housing 20. The screen 21a is exposed outside the second housing 20 through the opening portion 20a.

The second housing 20 has a mask portion 20b and a cover portion 20c which are connected to each other to provide a housing function. The second housing 20 has a hinge side end portion 22a, an upper end portion 22b located on a side opposite to the hinge side end portion 22a, and right and left side end portions 22c, 22d located between the hinge side end portion 22a and the upper end portion 22b.

The mask portion 20b has a hinge side wall portion 20ba, an upper wall portion 20bb and right and left side wall portions 20bc, 20bd, which are located in positions corresponding to the hinge side end portion 22a, the upper end portion 22b and the right and left side end portions 22c, 22d, respectively.

As shown in FIG. 3, the cover portion 20c includes a front oblique surface portion 20c1 and right and left side oblique surface portions 20c3, 20c4 which extend to the hinge side end portion 22a, the upper end portion 22b and the right and left side end portions 22c, 22d, respectively. The oblique surface portions 20c1 to 20c3 between the cover portion 20c and each of the hinge side end portion 22a, the upper end portion 22b and the right and left side end portions 22c, 22d makes the external appearance of the portable computer 1 look small. In particular, as shown in FIG. 4, the external appearance of the portable computer 1 in a side view can be made to look more compact.

The second housing 20 has a pair of connecting leg portions 23a, 23b on one of its end portions. The connecting leg portions 23a, 23b are hinge portions by which the first housing 10 and the second housing 20 are connected to each other so that the display unit 3 can rotate between a position in which the display unit 3 is closed with respect to the body unit 2 (i.e. the screen 21a is covered with the first housing 10) and a position in which the display unit 3 is opened with respect to the body unit 2 (i.e. the screen 21a is uncovered). The connecting leg portions 23a, 23b are disposed so as to be spaced away from each other in the width direction of the second housing 20, and each of the connecting leg portions 23a, 23b is connected to the first housing 10.

As shown in FIGS. 3 and 4, in the portable computer 1 according to the embodiment, the connecting protrusion 15b is exposed to the outside when the display unit 3 is in the close position. The connecting protrusion 15b internally communicates with the body unit 2. With this configuration, the capacity of the body unit 2 is increased so that a larger number of functional components can be accommodated in the body unit 2.

The perimeter 2a of the first housing 10 is smaller than the perimeter 3a of the second housing 20. In a top view of the portable computer 1, the perimeter 2a of the first housing 10 is located within the perimeter 3a of the second housing 20. Thus, the external appearance of the portable computer 1 can be made to look more compact when the portable computer 1 is seen from above. Here, the term "perimeter" implies an outer edge of each of the housings, and is designated by a dot-line in each of FIGS. 2 and 3.

Electronic components such as a pointing device 40, a hard disk drive (HDD) 50, etc. are accommodated inside the first housing 10. An opening portion 99 which is opened in a range of from the bottom wall portion 11a to the rear wall portion 11f is provided in the first housing 10 so that a battery unit (a battery pack) 100 is accommodated in the opening portion 99.

The battery unit 100 according to one embodiment will be described in detail with reference to FIGS. 5 to 8.

Figure 5:
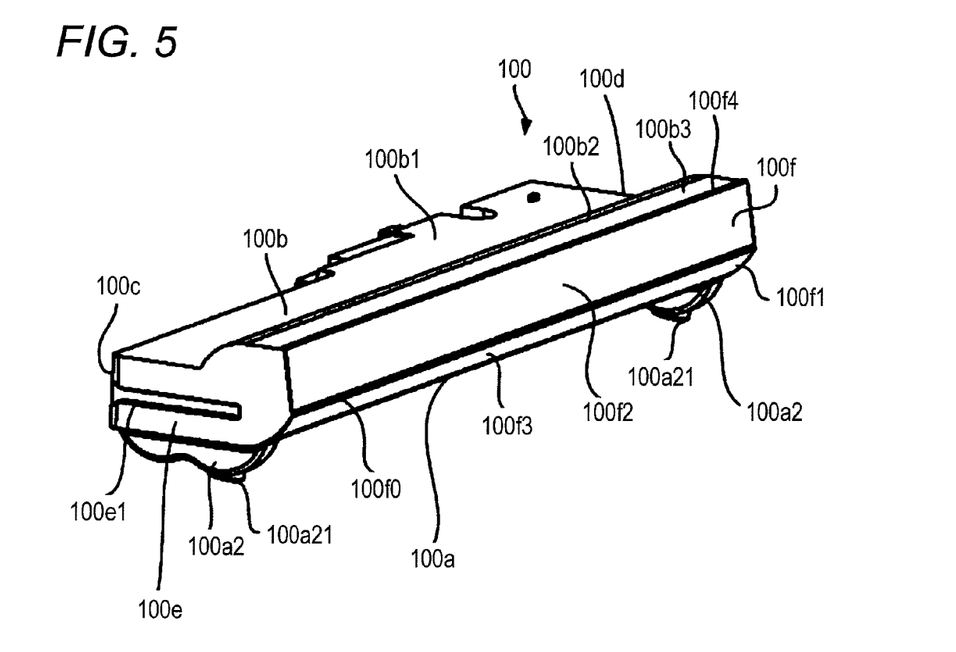
FIG. 5 is an exemplary rear perspective view of a battery unit of the portable computer according to the embodiment.
Figure 6:
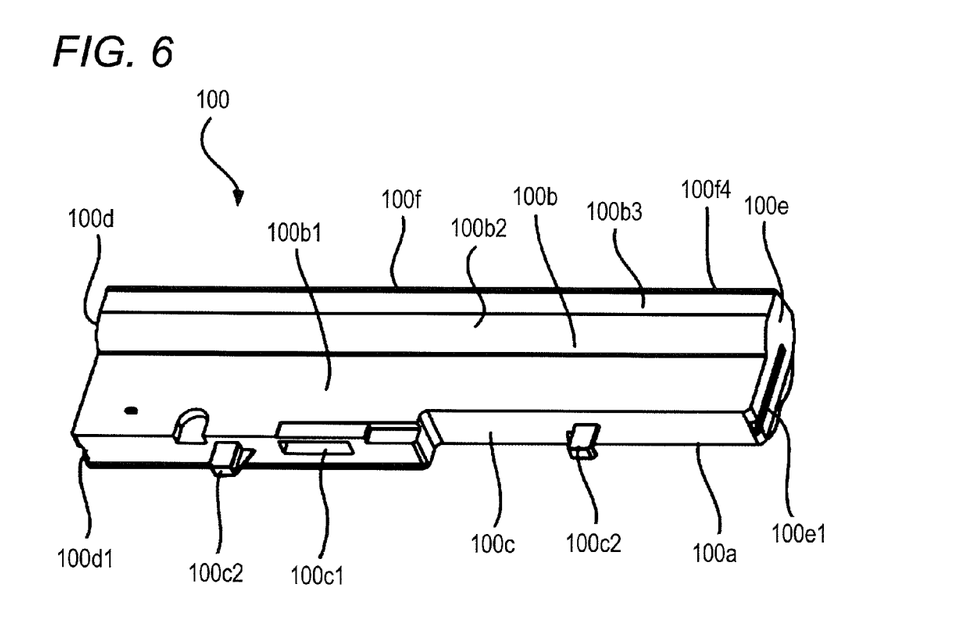
FIG. 6 is an exemplary front perspective view of the battery unit of the portable computer according to the embodiment.
Figure 7:
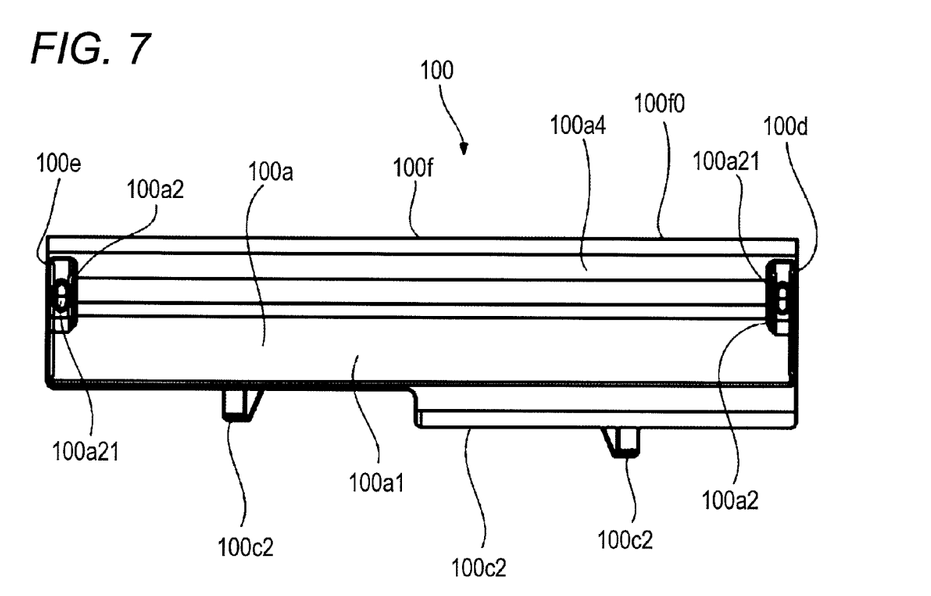
FIG. 7 is an exemplary bottom view of the battery unit of the portable computer according to the embodiment.
Figure 8:
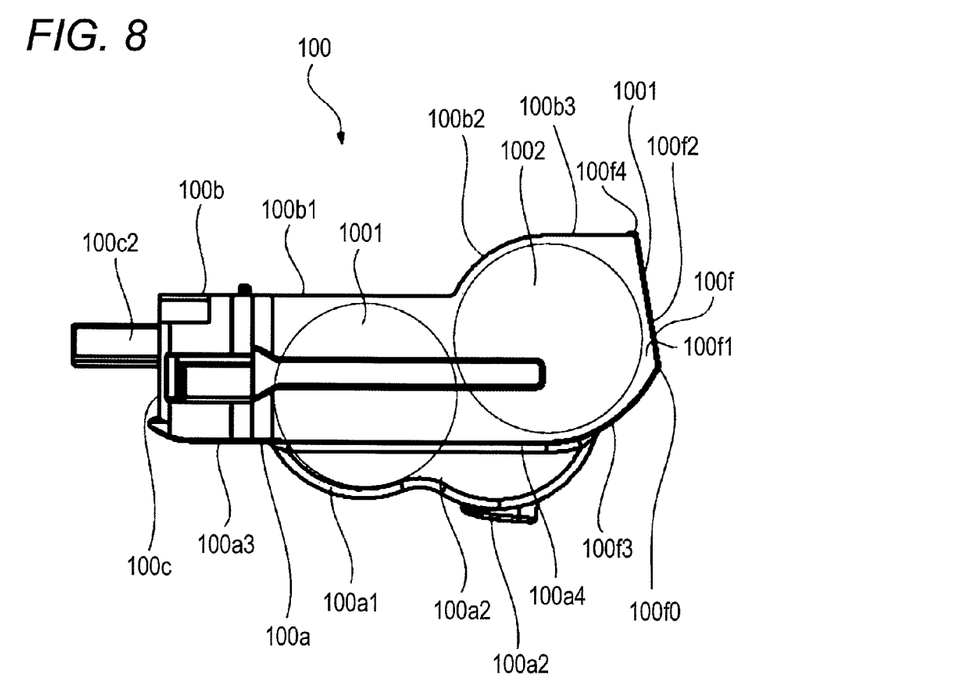
FIG. 8 is an exemplary side view of the battery unit of the portable computer according to the embodiment.

FIG. 5 is an exemplary rear perspective view of the battery unit 100. FIG. 6 is an exemplary front perspective view of the battery unit 100. FIG. 7 is an exemplary bottom view of the battery unit 100. FIG. 8 is an exemplary side view of the battery unit 100.

As shown in FIGS. 6 to 8, the battery unit 100 has a bottom portion 100a, a top portion 100b, a front portion 100c, left and right side portions 100d and 100e, and a rear portion 100f. Batteries 1001, 1002 are accommodated inside the battery unit 100.

As shown in FIGS. 7 and 8, the bottom portion 100a serves as a part of the bottom wall portion 11a of the first housing 10. That is, the bottom portion 100a is exposed outside the first housing 10 as a part of an outer surface of the first housing 10. The bottom portion 100a has a protruded portion 100a1, support portions 100a2, a front flat portion 100a3, and a rear flat portion 100a4.

The protruded portion 100a1 is located between the front flat portion 100a3 and the rear flat portion 100a4, and has a circular cylindrical shape which is bulged from a plane defined by the front flat portion 100a3 and the rear flat portion 100a4. That is, the protruded portion 100a1 has a circular arc sectional shape. Because the protruded portion 100a1 is protruded from a plane parallel to and below the bottom wall 11a, components located inside the protruded portion 100a1 may be affected by external stress due to a contact with external members. However, owing to the circular arc sectional shape of the protruded portion 100a1, shock caused by the external stress can be dispersed. As shown in FIG. 8, a part of the cylindrical battery 1001 may be arranged inside the protruded portion 1001a. With this configuration, the battery 1001 can be protected from external shock, and arranged inside the battery unit 100 in such a manner that unnecessary empty space is reduced.

The rear flat portion 100a4 is provided between the protruded portion 100a1 and the rear wall portion 11f. Consequently, the external appearance of the portable computer 1 in a rear view can be made to look thin.

Each of the support portions 100a2 is provided in a range of from the protruded portion 100a1 to the rear flat portion 100a4. Leg portions 100a21 are provided in the support portions 100a2 respectively. When the portable computer 1 is placed on an external member such as a desk, the leg portions 100a21 abut on the external member and support the portable computer 1. The distal ends of the leg portions 100a21, that is, parts of the leg portions 100a21 which abut on the external member, are located so as to be most distant from the bottom wall portion 11a. Consequently, when the portable computer 1 is placed on an external member such as a desk, the orientation of the portable computer 1 can be kept inclined forward to improve performance of user's key input.

Like the protruded portion 100a1, each of the support portions 100a2 has a circular arc sectional shape. Consequently, stress transmitted from the leg portions 100a21 to the first housing 10 can be dispersed and relaxed.

As shown in FIGS. 5 and 6, the top portion 100b has a front flat portion 100b1, a curved surface portion 100b2, and a rear flat portion 100b3. The front flat portion 100b1 is disposed to face a part of the keyboard 14 or to face a region near the keyboard 14. The rear flat portion 100b3 is disposed to face the connecting protrusion 15b. The curved surface portion 100b2 is arranged between the front flat portion 100b1 and the rear flat portion 100b3, and has a circular arc sectional shape.

As shown in FIG. 8, a part of the cylindrical battery 1002 may be arranged inside the curved surface portion 100b2. For example, when the battery unit 100 is repetitively placed in and out, an external substance such as a pebble may enter the opening portion 99 and may be stuck between the curved surface portion 100b2 and the first housing 10, in which case stress is applied on the curved surface portion 100b2. Even in such a case, in the battery 1002 can be protected from the stress, and can be arranged inside the battery unit 100 in such a manner that unnecessary empty space is reduced.

As shown in FIGS. 6 and 7, the front portion 100c has a connector 100c1 for electrically connecting the battery unit 100 to the first housing 10, and locking portions 100c2 for fixing the battery unit 100 to the first housing 10. Slits 100d1, 100e1 are formed in the left and right side portions 100d, 100e respectively so as to be fitted to slider portions (not shown) of the first housing 10 to regulate the attachment and detachment of the battery unit 100. With this configuration, the battery unit 100 can firmly be fixed to the first housing 10, and can smoothly be attached or detached with respect to the first housing 10.

As shown in FIGS. 5 to 8, the rear portion 100f serves as a part of the rear wall portion 11f of the first housing 10. That is, the rear portion 100f is exposed outside the first housing 10 as a part of the outer surface of the first housing 10. The bottom portion 100a has a bulged portion 100f1. The bulged portion 100f1 has a rear region defined by a flat surface portion 100f2 and a curved surface portion 100f3.

The bulged portion 100f1 protrudes toward the rear outside of the first housing 10 from the rear flat portion 100b3. That is, the bulged portion 100f1 is located in the rear of the first housing 10 so as to be more rearward than the connecting protrusion 15b and the hinge side end portion 22a in a state in which the display unit 3 is closed. The bulged portion 100f1 has an end portion 100f0. The end portion 100f0 is a corner defined by the flat surface portion 100f2 and the curved surface portion 100f3.

As shown in FIG. 8, a part of the battery 1002 is arranged inside the bulged portion 100f1. By housing the battery 1002 inside the bulged portion 100f1 which is protruded outward from the housing 10, the capacity of the battery unit 100 can sufficiently be ensured.

The curved surface portion 100f3 has a surface which extends from the end portion 100f0 toward the bottom wall portion 11a of the body unit 2 so as to be curved to have a circular arc section. The curved surface portion 100f3 is continuously connected to a surface of the rear flat portion 100a4. Here, "continuously connected" implies a condition in which there is no large difference in level between surfaces so that the surfaces look as if they form a single surface.

The curved surface portion 100f3 has a shape that is bulged like a circular cylinder. Because the curved surface portion 100f3 is located in a corner portion of the portable computer 1, the curved surface portion 100f3 may receive external stress such as contact with an external member, like the protruded portion 100a1. However, owing to the circular arc sectional shape of the he curved surface portion 100f3, shock caused by the external stress can be dispersed. As shown in FIG. 8, a part of the cylindrical battery 1002 is arranged inside the curved surface portion 100f3. With this configuration, the battery 1002 can be protected from external shock, and can be arranged inside the battery unit 100 in such a manner that unnecessary empty space is reduced.

The flat surface portion 100f2 has a flat surface which extends from the end portion 100f0 toward the display unit 3. The flat surface portion 100f2 has an end portion 100f4 on a side opposite to the end portion 100f0 of the bulged portion 100f1. The end portion 100f4 is continuously connected to a surface of the connecting protrusion 15b.

Figure 9:
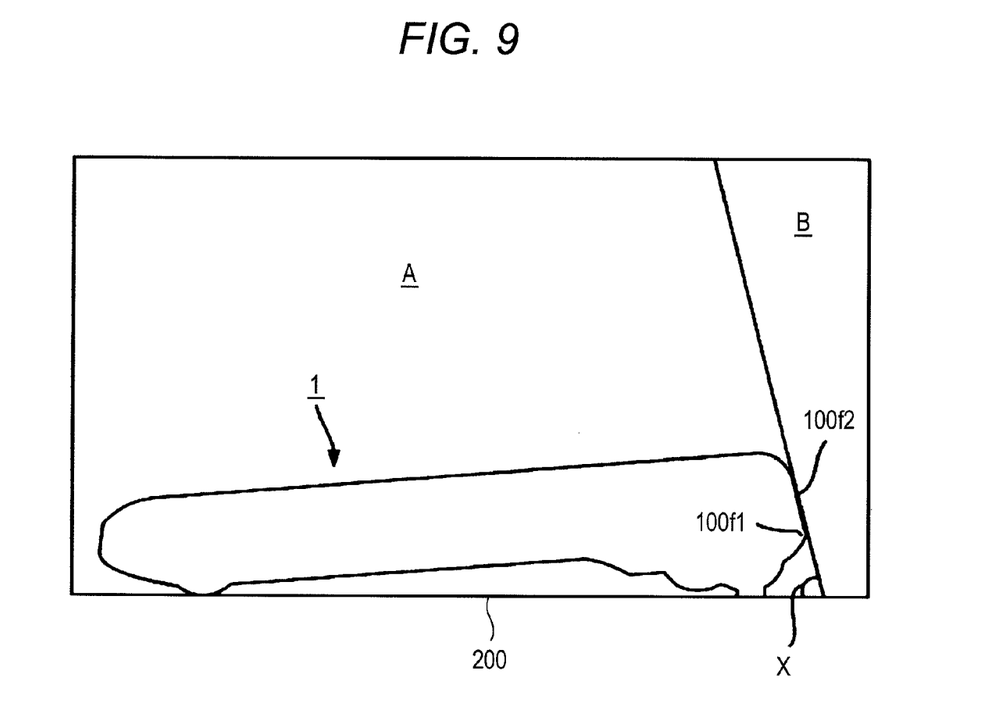
FIG. 9 is an exemplary side view of the portable computer according to the embodiment that is placed on a work surface.

The configuration of the flat surface portion 100f2 of the portable computer 1 will be described in detail with reference to FIG. 9. FIG. 9 is an exemplary side view of the portable computer 1 that is placed on a work surface 200.

The flat surface portion 100f2 forms an angle X with the work surface 200. In FIG. 9, the angle X between the flat surface portion 100f2 and the work surface 200 forms a boundary between a front region A and a rear region B. As described above, the flat surface portion 100f2 extends from the end portion 100f0 toward the display unit 3, and is continuously connected to the surface of the connecting protrusion 15b. When the portable computer 1 is placed on the work surface 200, the configuration of the leg portions 100a21 maintains the orientation of the portable computer 1 to be forwardly inclined.

According to the configurations of the embodiment described above, when, for example, the user sits on a chair or the like and views the portable computer 1 from the region A in a state in which the display unit 3 is closed, it is possible to make the user feel that the apparent size of the portable computer 1 is the perimeter 3a of the display unit 3. Consequently, the user does not recognize the perimeter 2a of the body unit 2 which is larger than the display unit 3, so that there is no oppressive feeling given to the user.

Moreover, according to the portable computer 1 of the embodiment described above, the battery capacity can efficiently be ensured in the region A because the portable computer 1 has the flat surface portion 100f2 extending flat along the angle X with the work surface 200.

As described above, according to the portable computer 1 of the embodiment, reduction in size of the portable computer 1 can be achieved while efficiently ensuring the battery capacity and the capacity of the body unit 2.

An electronic apparatus according to the invention is not limited to the portable computer 1, and may be other various electronic apparatuses having a battery unit 100, such as an electronic notebook, a PDA, etc.

While certain embodiments have been described, these embodiments have presented by way of example only, and are not intended to limit the scope of the invention. Indeed, the novel systems described herein may be embodied in variety of other forms; furthermore, various omissions, substitutions and changes in the form of the and systems described herein may be made without departing of the spirit of the invention. The accompanying claims and their equivalents are intended to cover such forms or modifications as would fall within the scope and spirit of the invention.

What is claimed is:
1. An electronic apparatus comprising:
a body housing;

a display housing in which a display device is accommodated, the display housing comprising an end portion; and a hinge portion connected to the end portion of the display housing, wherein the hinge portion connects the display housing and the body housing such that the display housing and the body housing are relatively rotatable between a first position in which a display screen of the display device is covered with the body housing and a second position in which the display screen is uncovered, a battery housing portion comprising:
  a connecting portion which connects the battery housing portion to the body housing;
  a bulged portion which is bulged in a direction opposite to the connecting portion from a portion of the body housing that faces the end portion of the display housing in the first position;
  a flat wall portion which extends toward the display housing from the bulged portion;
  a support portion which abuts on an external member and supports the body housing when the body housing is placed on the external member,
  a first battery housed in the battery housing portion, wherein at least a part of the first battery is arranged inside the bulged portion; and
  a second battery housed in the battery housing portion, wherein the second battery is arranged on the inner side of the body housing than the first battery such that the support portion is located between the first battery and the second battery.

2. The apparatus of claim 1, wherein the body housing comprises a bottom wall portion, and
  the support portion is a protruded portion which is protruded from the bottom wall portion of the body housing.

3. The apparatus of claim 2, wherein the bulged portion is positioned between the display housing and the bottom wall portion, and the battery housing portion comprises a second wall portion which extends from the bulged portion toward the bottom wall portion.

4. The apparatus of claim 3, wherein the second wall portion has a cross-section which is curved in a circular arc shape.

5. The apparatus of claim 4, wherein the battery housing portion is detachable from the body housing; and
  the wall portion is configured to form a part of a side wall portion extending between the body housing and the display housing.

6. The apparatus of claim 5, wherein the battery housing portion has a support portion which is more protruded than the protruded portion.

7. An electronic apparatus comprising:
  a housing comprising a bottom wall portion;
  a battery housing portion comprising:
    a connecting portion which connects the battery housing portion to the body housing; and
    a bulged portion having a flat inclined surface and a bulged shape which is bulged in a direction opposite to the connecting portion from a side of the housing; and
  a protruded portion which is protruded from the bottom wall portion of the housing,
  a support portion which is more protruded than the protruded portion,
  a first battery housed in the battery housing portion, wherein at least a part of the first battery is arranged inside the bulged portion; and
  a second battery housed in the battery housing portion, wherein the second battery is arranged such that the support portion is located between the first battery and the second battery.

8. The apparatus of claim 7, wherein the battery housing portion comprises a second wall portion which extends from the bulged portion toward the bottom wall portion.

* * * * *